sulfur compounds and particularly to a method for producing organic compounds containing a thiophene nucleus such as thiophene and its homologs, as well as substituted thiophene compounds.

UNITED STATES PATENT OFFICE 2,694,075

PREPARATION OF THIOPHENE COMPOUNDS

Louis E. Ruidisch, Fishkill, N. Y., and Du Bois Eastman, Whittier, Calif., assignors to The Texas Company, New York, N. Y., a corporation of Delaware No Drawing. Application December 4, 1951, Serial No. 259,895

15 Claims. (Cl. 260—332.8)

This invention relates to the production of heterocyclic sulfur compounds and particularly to a method for producing organic compounds containing a thiophene nucleus such as thiophene and its homologs, as well as substituted thiophene compounds.

This application is a continuation-in-part of our copending applications Serial No. 630,148, filed November 21, 1945, and Serial No. 773,310, filed September 10, 1947 both of which have now been abandoned.

In the past, the utility and application of heterocyclic sulfur compounds, including thiophene compounds, have been restricted in scope and were primarily of academic interest, due to the fact that economical and commercial methods of preparation were not available. Although various reactions have been proposed for the production of thiophene compounds, such reactions have been useful only for small scale laboratory preparations. One of the methods which has been used for the preparation of thiophene itself is the reaction of acetylene and sulfur-yielding catalyst or hydrogen sulfide. This type of reaction produces a variety of sulfur-containing compounds and results in a low ultimate yield of thiophene.

It has now been found that heterocyclic sulfur compounds and particularly those containing a thiophene nucleus, can be synthesized from a large class of reactants in accordance with a new and improved vapor phase catalytic process which is easily adapted to commercial operations.

The process of the invention involves broadly the vapor phase reaction of hydrogen sulfide or a volatile thermally labile sulfide with an organic compound containing a non-acetylenic, non-conjugated aliphatic chain of at least two carbon atoms at an elevated temperature in the presence of a solid particulate surface-active catalyst to produce a reaction product from which an organic compound containing a thiophene nucleus is recovered. In the preferred aspect of the invention, the process involves vapor phase reaction of hydrogen sulfide and a non-acetylenic hydrocarbon containing an aliphatic chain of at least two carbon atoms at a temperature between 700 and 1,500° F. in the presence of a dehydrogenation catalyst such as chromia-alumina and molybdena-alumina to produce thiophene compounds. In order to obtain substantial yields of thiophene it is necessary to effect the thiophene-forming reaction at a contact time of 0.1 to 5 seconds which is realized by charging the reactants in the vapor phase to the catalyst-containing reaction zone at a space velocity of approximately 0.2 to 5 weights of hydrocarbon per hour per weight of catalyst at a mol ratio of hydrogen sulfide to hydrocarbon within the range of 0.5 to 6.

The compounds that react with hydrogen sulfide and volatile thermally labile sulfides under the prescribed reaction conditions to yield thiophene compounds comprise organic compounds having a non-acetylenic and non-conjugated aliphatic chain of at least two carbon atoms. While charge stocks other than hydrocarbons can be employed, the thiophene-forming reaction of the invention is ordinarily effected with non-acetylenic, non-conjugated aliphatic hydrocarbons containing at least two carbon atoms and preferably containing four carbon atoms. Saturated aliphatic hydrocarbons such as ethane, propane, butane and pentane, and olefinic aliphatic hydrocarbons such as ethylene, propylene, butylene and pentene are usually employed in the process of this invention.

The process of the invention is especially applicable to the production of thiophene itself or to thiophene compounds possessing acyclic substituents. The type of thiophene compounds produced by the reaction process is dependent to a large extent on the choice of charge stock used in the reaction. To produce either thiophene or a thiophene derivative containing an acyclic constituent, the charge material is preferably a saturated or unsaturated acyclic hydrocarbon having at least two aliphatic carbon atoms in a chain or a mixture of organic compounds containing a substantial proportion of hydrocarbons of this type. Low molecular weight aliphatic hydrocarbons, such as are produced from the processing of petroleum or natural gas, constitute suitable charge stocks for the preparation of thiophene and lower acyclic homologs. When acyclic hydrocarbons containing more than four carbon atoms are used in the reaction, acyclic homologs of thiophene containing one or more side chains are the predominant product. There appears to be no upper limit on the chain length of the hydrocarbons employed for the charge stock with the exception that the hydrocarbons should be in the vapor form under the reaction conditions. When relatively simple reaction products are desired, however, it is advisable to employ a charge stock containing $C_4$ to $C_{10}$ hydrocarbons.

Charge stocks other than hydrocarbons such as substituted acyclic hydrocarbons containing substituents such as hydroxl groups and halogen atoms which are readily removed from the reactant during the course of the reaction can also be employed in the process of this invention. Halogenated hydrocarbons such as 1-chloro-butene-2, 2-bromobutane, 1,2-dichloroethane and 1,2,3-trichlorobutane are converted to thiophene by the process of the invention; apparently, these halogenated compounds undergo dehydrochlorination to olefins prior to their heterocyclization since the predominant heterocyclic product is thiophene itself. In general, halogenated organic compounds containing up to one halogen atom per carbon atom of the aliphatic chain can be employed as charge materials in the process of this invention. It has been noted, however, that even such highly halogenated materials as tetrahalo ethane, when reacted with hydrogen sulfide under the prescribed conditions of reaction, give small yields of thiophene. Monohydroxy and polyhydroxy hydrocarbons as exemplified by butyl alcohol, butylene glycol, propylene glycol and glycerine are all converted to compounds containing a thiophene nucleus by reaction with hydrogen sulfide in accordance with this invention. Similar to the halogen-substituted hydrocarbons, hydroxy-substituted hydrocarbon containing up to one hydroxy group per carbon atom of the aliphatic chain can be employed in the process of this invention.

The preparation of condensed ring thiophene compounds such as thianaphthene, also called benzothiophene, from cyclic compounds which contain an aliphatic hydrocarbon side chain of at least two carbon atoms which is not in conjugated relationship with the cyclic nucleus and a hydrogen atom on the nuclear carbon atom adjacent to the side chain, is covered in the copending application of Rush F. McCleary and Lawrence W. Devaney Serial No. 784,506, filed November 6, 1947 which is now U. S. Patent 2,591,710.

As previously stated, the sulfur reactant may be either hydrogen sulfide or a volatile thermally labile sulfide. It is preferred, of course, to use hydrogen sulfide but it may be replaced by other sulfides which are volatile and thermally labile under the conditions of reaction including organic and inorganic sulfides, hydrosulfides and polysulfides which are decomposed to hydrogen sulfide and/or sulfur under reaction conditions. Metal sulfides are excluded from the usable inorganic sulfides since they decompose to non-volatile metallic constituents which tend to deposit on the catalytic surfaces and destroy catalyst activity. Thus only the non-metal and metalloid inorganic sulfides are included within the scope of inorganic volatile thermally labile sulfides; examples of such are ammonium sulfide, ammonium hydrosulfide and ammonium polysulfide. Useful volatile thermally labile organic sulfides include the aliphatic mercaptans and sulfides, particularly those containing a tertiary carbon atom; ethyl mercaptan, ethyl sulfide, tertiary butyl mercaptan and tertiary butyl sulfide illustrate the organic members of this class.

The heterocyclization process of the invention is effected in the presence of a solid particulate surface-active catalyst which can be generally described as metal and metalloid oxides and/or sulfides that are stable under reaction conditions. Included within the scope of metal and metalloid oxides and sulfides that can be employed in the process of the invention are such oxides as molybdena which undergo conversion to the corresponding sulfide under the conditions of reaction. Particularly preferred catalysts for the process of the invention are dehydrogenation type catalysts since apparently the heterocyclization process of the invention passes through an intermediate dehydrogenation step. Dehydrogenation catalysts generally comprise oxides and sulfides of the metals and metalloids of groups V, VI, VII and VIII, in combination with a surface-active support such as silica or alumina. Particularly active dehydrogenation catalysts are the oxides and sulfides of group VI metals supported on a surface-active material. Examples of these preferred dehydrogenation catalysts are chromia-alumina, molybdena-alumina and molybdena sulfide-alumina.

The thiophene-forming reaction of the invention is effected at a minimum temperature of about 700° F. There appears to be no upper temperature limit on the reaction, but 1,500° F. is a practical upper limit, since best results are obtained at temperatures of 1,000 to 1,300° F.

The process of the reaction is ordinarily effected at atmospheric pressure, since there appears to be no critical pressure effects on the yield of thiophene produced by the reaction of hydrocarbons with hydrogen sulfide. In general, pressures of subatmospheric to 200 p. s. i. g. can be employed.

In order to obtain substantial yields of thiophene by by the reaction of hydrogen sulfide or a volatile thermally labile sulfide with organic compounds of the prescribed composition it is necessary to employ contact times in the range of 0.1 to 5 seconds. (Contact time as used in this invention designates the superficial residence time in the reaction zone based on the materials charged thereto at reaction conditions and is calculated on the assumption that there is 50 per cent free space in the catalyst-filled reaction zone.) When the contact time is less than 0.1 second, the yield of thiophene compound is insignificant since there is insufficient time for the organic compounds to undergo the dehydrogenation and heterocyclization reactions required for thiophene formation. When contact times longer than 5 seconds are employed, substantial decomposition of the formed thiophene takes place during its prolonged residence in the high temperature reaction zone so that the yield of liquid thiophene is less than 1 weight per cent. In examples presented hereafter illustrating the invention, it will be clearly demonstrated that the thiophene-forming reaction of this invention requires that the reactants be in contact with the catalyst at the prescribed temperature conditions for a duration falling within the prescribed limits of 0.1 to 5 seconds. Preferred contact times in which the best yields of thiophene compounds are obtained are of the order of 0.2 to 2 seconds.

The prescribed contact times are generally obtained by charging the reactants to the reaction zone at a space velocity of approximately 0.2 to 5 weights of hydrocarbon per hour per weight of catalyst, while the mol ratio of hydrogen sulfide to organic reactant is maintained within the limits of 0.5 to 6. The preferred space velocities are approximately 0.5 to 3; normally, the mol ratio of hydrogen sulfide to organic compound in the charge mixture is between 1 and 4. These preferred space velocities and mol ratios result in the attainment of the preferred contact time of 0.2 to 2 seconds in the reaction zone.

In carrying out the process of the invention, the reactants in vapor form are introduced into a reaction chamber containing a dehydrogenation catalyst maintained at the desired reaction temperature. The catalytic reaction zone may either be a fixed bed or a fluid type, in which latter type operation the catalyst is maintained in powder form in a turbulent state.

It is evident that the process may be operated in accordance with any of the usual techniques for high temperature catalytic conversions. Thus, fixed catalyst beds may be used in alternate reaction and regeneration cycles; fluid catalyst operation may be used wherein catalyst is continuously withdrawn from the catalyst zone, regenerated and reintroduced into the catalyst zone after regeneration; fluidized fixed bed operation may also be used in which the catalyst particles remain in the reaction zone during alternate reaction and regeneration cycles; stirred catalyst beds as well as moving catalyst beds of the Thermofor type are other possible alternatives.

The particular conditions of reaction are best illustrated by reference to conditions involved in the reaction of an unsaturated acyclic hydrocarbon, such as butylene-2 over chromia-alumina catalyst employing a fixed bed type of process technique. When charging butylene-2 over a chromia-alumina catalyst, the space velocity advantageously falls within the range of 0.5 to 3.0 and the mol ratio of $H_2S$ to butylene-2 preferably lies within the range of 1.0 to 4.0; the reaction is advantageously effected at about 0.5 second while the temperature in the catalyst zone is maintained between about 950 and 1200° F. It is to be understood that the specific conditions described as optimum are those which result in optimum yields of thiophene in a single pass operation. Where a continuous recycle process is used, it may be desirable to modify these conditions of reaction in order to obtain an optimum yield of the desired product.

The process period for optimum thiophene production will depend to some extent upon the charge stock and the reaction conditions employed, but will generally be of longer duration than one hour. In any case, periodic determination of thiophene yields will indicate the practical period of catalyst activity before regeneration. When the thiophene yields are found to fall off sharply, the catalyst may then be regenerated by conventional methods, such as regeneration with air at about 1100° F. which methods are typical of the type of catalyst technique employed.

Thiophene compounds produced by the reaction may be recovered from the reaction products in accordance with conventional methods of recovery. For example, the reaction products containing unreacted charge stocks, sulfur, cracked products of the charge stock, diolefinic compounds, unreacted hydrogen sulfide may be passed through a caustic soda solution to dissolve the acid gases. If the caustic soda solution is maintained cold, the thiophene will condense as a supernatant layer. The thiophene layer can be drawn off therefrom and distilled. If the caustic soda solution is maintained hot, the thiophene compounds will steam distill from the caustic solution and can then be separated from the water layer and purified by distillation.

The thiophene compounds may also be recovered in crude form by a simple condensation procedure which involves passing the products into a cool body of hydrocarbon oil, such as kerosene, in which the thiophene compounds will condense; thiophene compounds can later be recovered from the condensing oil by distillation.

The process of the invention is illustrated by the following specific examples which clearly show the necessity of effecting the thiophene-forming reaction at a contact time between 0.1 and 5 seconds.

*Example I*

Butylene-2 and hydrogen sulfide in a mol ratio of about 1.9 mols of hydrogen sulfide per mol of butylene-2 were mixed, preheated to approximately reaction temperature, and charged to a catalytic fixed-bed reaction chamber maintained at 1100° F. and atmospheric pressure. The catalytic reaction chamber contained a catalyst which consisted of mixture of chromic oxide and alumina having the approximate composition of 10% $Cr_2O_3$ and 90% $Al_2O_3$. The reactants were charged at a hydrocarbon space velocity of 0.9 weights of butylene-2 per hour per weight of catalyst and a contact time of about 0.54 second was realized. The catalyst was maintained on stream for a period of about 75 minutes without reactivation. Crude thiophene of about 95% purity was obtained in a yield of about 55.4 pounds per 100 pounds of butylene-2 charged.

*Example II*

Butylene-2 and hydrogen sulfide in a mol ratio of about 1.9 mols of hydrogen sulfide per mol of butylene-2 were mixed, preheated to approximately reaction temperature and charged to a catalytic fixed-bed reaction chamber maintained at 1100° F. and atmospheric pressure. The catalytic reaction chamber contained a catalyst which consisted of a mixture of chromic oxide and silica having the approximate composition of 10% $Cr_2O_3$ and 90% $SiO_2$. The reactants were charged at a hydrocarbon space velocity of approximately 0.9 weights of butylene-2 per hour per weight of catalyst and a contact time of about 0.54 seconds was realized. The catalyst was maintained on stream for a period of about 75 minutes without reactivation. Crude thiophene of about 95% purity was obtained in a yield of about 33.9 pounds per 100 pounds of butylene-2 charged.

Example III

Butylene-2 and hydrogen sulfide in a mol ratio of about 1.8 mols of hydrogen sulfide per mol of butylene-2 were mixed, preheated to approximately reaction temperature and charged to a catalytic fixed bed reaction chamber maintained at 1100° F. and atmospheric pressure. The catalytic reaction chamber contained a catalyst which consisted of a mixture of molybdenum oxide, zinc oxide and alumina having the approximate composition of 9.5% $MoO_3$ supported on $Zn(AlO_2)_2$. The reactants were charged at a hydrocarbon space velocity of approximately 0.8 weights of butylene-2 per hour per weight of catalyst and a contact time of about 0.63 seconds was realized. The catalyst was maintained on stream for a period of about 75 minutes without reactivation. Crude thiophene of about 95% purity was obtained in a yield of about 34.9 lbs. per 100 lbs. of butylene-2 charged.

Example IV

Ethylene and hydrogen sulfide in a mol ratio of 1.0 mols of hydrogen sulfide per mol of ethylene were mixed, preheated to approximately reaction temperature and charged to a catalytic fixed bed reaction chamber maintained at 1115° F. and atmospheric pressure. The catalytic reaction chamber contained a catalyst which consisted of a mixture of chromic oxide and alumina having the approximate composition of 10 per cent $Cr_2O_3$ supported on $Al_2O_3$. The reactants were charged at a hydrocarbon space velocity of approximately 0.9 weights of ethylene per hour per weight of catalyst and a contact time of about 0.39 seconds was realized. The catalyst was maintained on stream for a period of about 75 minutes without reactivation. Crude thiophene of about 95 per cent purity was obtained in a yield of about 2 pounds per 100 pounds of ethylene charged.

Example V

Normal butane and $H_2S$ in a mol ratio of about 1.8 mols of $H_2S$ per mol of butane were mixed, preheated to approximately reaction temperature and charged to a catalytic fixed bed reaction chamber maintained at 1090° F. and atmospheric pressure. Catalytic reaction chamber contained a chromia-alumina catalyst which had the approximate weight composition of 10% chromia and 90% alumina. The reactants were charged at an hydrocarbon space velocity of 0.9 weights of butane per hour per weight of catalyst so that reaction was effected at a contact time of approximately 0.59 seconds. The catalyst was maintained on stream for a period of about 75 minutes. The yield of crude liquid thiophene amounted to 31.2 pounds per hundred pounds of butane charged.

Example VI 1,390 g. of butylene-2 and 2,140 g. of hydrogen sulfide were mixed, preheated to a temperature of approximately 1,085° F. and charged to a reaction chamber maintained at a temperature of about 1,085° F. and containing 90 g. of a chromia-silica-stabilized alumina catalyst comprising approximately 10 per cent $Cr_2O_3$, 5 per cent $SiO_2$ and 85 per cent $Al_2O_3$. The reactants were charged at a hydrocarbon space velocity of approximately 31 weights of butylene-2 per hour per weight of catalyst and a contact time of about 0.013 seconds was realized. After 30 minutes no liquid product had been recovered. The effluent gas was caustic washed for $H_2S$ removal; the caustic-washed gas had the following composition in volume per cent:

| | |
|---|---|
| Methane | 4.3 |
| Ethylene | 3.4 |
| Propylene | 1.0 |
| Propane | 1.0 |
| Butane | 1.0 |
| Butylene | 31.2 |
| Hydrogen | 58.1 |

Example VII

Normal butane and $H_2S$ in a mol ratio of about 2 mols of $H_2S$ per mol of butane were mixed, preheated to approximately reaction temperature and charged to a catalytic fixed bed reaction chamber maintained at 1100° F. and atmospheric pressure. Catalytic reaction chamber contained a silica-stabilized chromia-alumina catalyst which had the approximate weight composition of 5% silica, 10% chromia and 85% alumina. The reactants were charged at a hydrocarbon space velocity of 0.083 weights of butane per hour per weight of catalyst so that reaction was effected at a contact time of approximately 5.9 seconds. The catalyst was maintained on stream for a period of about 300 minutes. The yield of crude liquid thiophene amounted to only 0.75 pounds per hundred pounds of butane charged.

Example VIII

Normal butane and $H_2S$ in a mol ratio of about 1.7 mols of $H_2S$ per mol of butane were mixed, preheated to approximately reaction temperature and charged to a catalytic fixed bed reaction chamber maintained at 1100° F. and atmospheric pressure. Catalytic reaction chamber contained a silica-stabilized chromia-alumina catalyst which had the approximate composition of 5% silica, 10% chromia and 85% alumina. The reactants were charged at a hydrocarbon space velocity of 0.045 weights of butane per hour per weight of catalyst so that the reaction was effected at a contact time of 12.1 seconds. After a reaction period of 330 minutes, there was obtained no liquid thiophene yield.

The foregoing examples clearly prove that organic compounds having an aliphatic hydrocarbon chain of 2 carbon atoms, halo hydrocarbons and hydroxy hydrocarbons are converted into thiophene compounds by reaction with $H_2S$ in excellent yield when the prescribed reaction conditions of temperature, catalyst and contact time are employed. Examples V, VI and VII clearly prove that it is necessary to employ a contact time within the prescribed limits of 0.1 to 8 seconds in order to obtain significant yields of thiophene by the process of the reaction, since at shorter and higher contact times the yield of thiophene compounds from normal butane which is one of the preferred charge materials, is insignificant outside the prescribed limits.

It will be understood, of course, that these examples are merely illustrative of the preferred embodiment of the invention and that other charge stocks and conditions of reaction may be employed in accordance with the previous description. By using other selected hydrocarbon charge stocks, thiophene compounds containing various substituents may be produced by the present process. Thus, other acyclic hydrocarbons containing two or more carbon atoms may be employed to produce thiophene itself or thiophene compounds containing acyclic substituents in which the number of carbon atoms in the side chain is dependent on the number of carbon atoms in the hydrocarbon charge. Further, other organic compounds containing an acyclic aliphatic chain of two or more carbon atoms may be employed to produce a variety of compounds containing a thiophene nucleus.

Obviously many modifications and variations of the invention as hereinbefore set forth may be made without departing from the spirit and scope thereof, and only such limitations should be imposed as are indicated in the appended claims.

We claim:

1. A process for the production of a compound possessing a thiophene nucleus which comprises passing a sulfide of the class consisting of $H_2S$ and a volatile thermally labile sulfide and an acyclic organic compound selected from the group consisting of hydrocarbons, halo hydrocarbons and hydroxy hydrocarbons, containing a non-acetylenic, non-conjugated aliphatic chain of at least 2 carbon atoms into a reaction zone containing a solid particulate surface-active catalyst, reacting said sulfides and said organic compound at a contact time of 0.1 to 5 seconds at an elevated temperature of at least 700° F. to form said thiophene compound and removing from said reaction zone products of reaction containing said thiophene compound in substantial amount.

2. A process according to claim 1 in which the reaction is effected between 700 and 1500° F.

3. A process according to claim 1 in which the reaction is effected at a contact time of 0.2 to 2 seconds.

4. A process according to claim 1 in which there is employed a dehydrogenation catalyst comprising a surface-active support and a material selected from the group consisting of group V, VI, VII and VIII metal and metalloid oxides and sulfides stable under reaction conditions and mixtures thereof.

5. A process according to claim 1 in which there is employed a dehydrogenation catalyst comprising a surface-active support and a group VI metal oxide.

6. A process for the production of a compound possessing a thiophene nucleus which comprises passing $H_2S$ and an acyclic organic compound containing a non-acetylenic, non-conjugated hydrocarbon chain of at least 2 carbon atoms at a mol ratio of $H_2S$ to organic compound between 0.5 and 6 into a reaction zone containing a dehydrogenation catalyst comprising a surface-active support and a material selected from the group consisting of group V, VI, VII and VIII metal and metalloid oxides and sulfides stable under reaction conditions, and mixtures thereof, reacting said $H_2S$ and said organic compound at a contact time of 0.1 to 5 seconds and at an elevated temperature between about 700 and 1500° F. to form said thiophene compound and removing from said reaction zone products of reaction containing said thiophene compounds in substantial amount.

7. A process according to claim 6 in which the reaction is effected at a temperature between 1,000 and 1,300° F.

8. A process according to claim 6 in which said acyclic organic compound is an aliphatic hydrocarbon containing between 4 and 10 carbon atoms.

9. A process according to claim 6 in which said acyclic organic compound is a saturated aliphatic hydrocarbon containing between 4 and 10 carbon atoms.

10. A process according to claim 6 in which $H_2S$ and said acyclic organic compound are reacted at a contact time of 0.2 to 2 seconds.

11. A process according to claim 6 in which the catalyst is a group VI metal oxide supported on a surface-active material.

12. A process according to claim 6 in which the catalyst is a group VI metal sulfide supported on a surface-active material.

13. A process according to claim 6 in which the catalyst is chromic oxide alumina.

14. A process according to claim 6 in which the catalyst is molybdenum oxide alumina.

15. A process according to claim 6 in which the mol ratio of $H_2S$ to acyclic organic compound is between 1 and 4.

References Cited in the file of this patent

UNITED STATES PATENTS

| Number | Name | Date |
|---|---|---|
| 2,474,440 | Smith | June 28, 1949 |
| 2,478,914 | Greensfelder | Aug. 16, 1949 |
| 2,557,664 | Kreug | June 19, 1951 |
| 2,557,665 | Kreug | June 19, 1951 |
| 2,557,666 | Kreug | June 19, 1951 |
| 2,557,678 | Neuhaus et al. | June 19, 1951 |
| 2,558,507 | Appleby et al. | June 26, 1951 |
| 2,558,508 | Appleby et al. | June 26, 1951 |
| 2,570,722 | Sager | Oct. 9, 1951 |
| 2,591,710 | McCleary et al. | Apr. 8, 1952 |